3,202,134
REGENERATION OF THE HEAT OF BOILER FLUE GASES

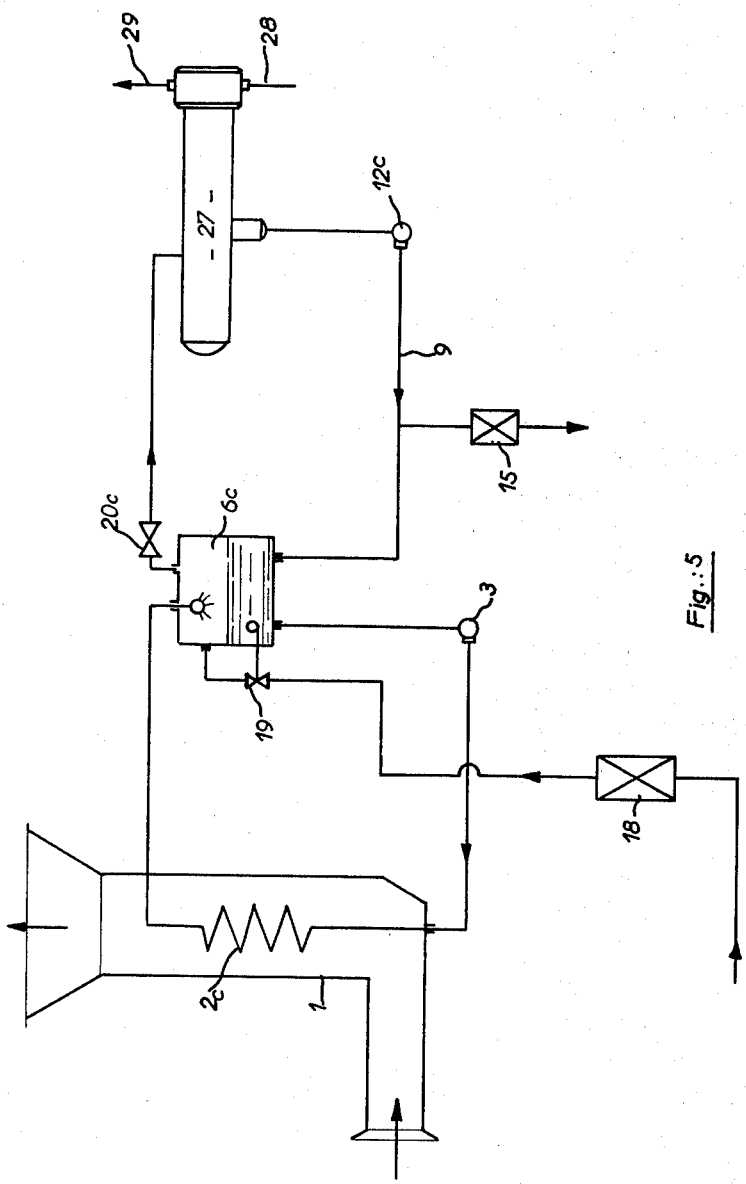
Fig.:5

Marcel Marcheix, Neuilly-sur-Seine, France, assignor to G. & J. Weir Ltd., Glasgow, England, a company of England
Filed Dec. 30, 1963, Ser. No. 334,509
Claims priority, application France, Jan. 3, 1963, 920,404; Feb. 26, 1963, 926,117
8 Claims. (Cl. 122—1)

The invention relates to the regeneration of the heat remaining in the flue gases of boilers, in an installation in which different quantities of heat intended for various heating operations employed in the boiler itself have been withdrawn from these flue gases. The invention therefore relates to the regeneration of the heat of the flue gases in the low-temperature zone of these flue gases, in particular in the temperature zone ranging between about 150° C and 90° C.

According to the present invention, some of the heat in the flue gases at low temperature is regenerated and transferred to another point of the installation to improve the efficiency thereof, the transfer being effected by means of an intermediate fluid constituted by water, which is partially vaporized by flashing outside the flue gas ducts, the steam generated being used to produce make-up feed water.

This steam may be either conveyed to a heater for the air of the boiler or conveyed to a feed water heater, for example to a heater normally supplied by drawing off steam from a turbine. The steam generated gives distilled water. Consequently, not only does the invention improve the cycle by utilizing heat at low temperatures and re-introducing it into the circuits, but it also furnishes a make-up water of suitable quality for the system, the commercial value of this make-up water being considerable.

In one form of embodiment, the steam generated in this way is conveyed into a combination air heater forming the first stage or an intermediate stage for the heating of this air.

This arrangement has many advantages in comparison with the conventional arrangement in which the combustion air is heated directly by the flue gases.

When air is conveyed into an air heater heated by flue gas, the distribution of this air over the exchange surfaces is extremely uneven. Devices of this kind are formed by baffle plates. Eddies are produced in some cases. Some parts are swept perfectly by the air, others are not swept at all, and so on.

Consequently, when the surface of such a device is dimensioned with a mean coefficient such that the cooling of the flue gases is not greater than that which might cause corrosion, it is never known whether this corrosion will not occur at some point of the air heater. The coefficient of transmission may in fact be higher at certain points because of a better distributed mass of air, a greater velocity, an accelerating eddy, etc.

Experience has shown that in these devices, by reason of these distribution occurrences, the wall then assumes certain temperatures which permit condensation of the sulphurous gases and consequent corrosion.

If the air were indeed well distributed, if the assumed or calculated mean coefficient were really discovered in the whole of the device at each point thereof, there would be no risk of drawbacks of this kind.

When, however, a device supplied with water is used to regenerate the heat of the flue gases, the distribution of the water is much better than that of the flue gases or air. Practically speaking, with water and a near enough suitable layout, the utilization of the tubes is the same everywhere and the coefficient of transmission in these tubes is the same.

If, then, water at a temperature relatively higher than that of the air which was in contact with the flue gases in the device previously described is taken, one can be sure that there will not be any sulphurous condensation at any point of the device.

The invention therefore not only enables the heat of the flue gases to be converted into steam, but it also makes it possible to proceed in such a manner that the flue gas to water exchanger walls are at a well-defined and well-calculated temperature and are not subject to corrosion.

In particular, in modern boilers it is sought more and more to lower the exit temperature of the gases and it is current practice to provide an outlet of the gases at only 90° C., for economic operation. It will be understood that when a direct flue gas-air to air or water to flue gas heat exchange surface is calculated for economic working, this surface is more than enough for lower loads of the boiler. The outlet temperature of the flue gases then drops considerably and this results in risks of fouling and corrosion. To avoid these risks, it is essential to provide by-pass, recirculating and other devices, all of which are elements which are complicated to construct and operate.

With the apparatus according to the invention, on the other hand, it will be sufficient, for example, to control the steam pressure by means of remote-controlled valves. By operating these valves, it will be possible to limit the quantity of steam generated and, consequently, the cooling of the flue gases when the boiler is functioning below the economic working conditions.

Moreover, as has been said previously, the lowering of the temperature of the flue gases, which is generally sought after to improve the efficiency of the units, results in the reappearance of corrosion phenomena on the tubular surfaces of exchangers in contact with the flue gases which are cooling down. Many investigations have been made in this connection, all of which have led to the conclusion that, in the temperature levels of the flue gases, there is a dangerous zone which is manifested by the appearance of a "bulge" in the curve giving the relative value of the weight of metal corroded as a function of the temperature of the wall in contact with the flue gases. The exact position of the "bulge" depends, of course, on the nature of the fuel, but all experts are agreed as to the presence of this dangerous zone.

It is also known that in an exchanger of the type of an economizer in which water circulates inside the tubes and the flue gas outside them, the temperature of the wall on the side where the flue gas is present is very close to the temperature of the water circulating inside the tubes. This is due to the great difference which exists between the coefficients of heat transfer on the side where the water is present and the side where the flue gas is present.

According to one feature of the invention, the heat regenerating apparatus according to the invention offers big advantages if at least two independent steam generating stages are installed, these being such that the temperatures of the water circulating inside the exchangers enable temperatures of the wall on the flue-gas side to be obtained which are located on either side of the dangerous zone or "bulge."

According to another feature, the heat exchange surfaces can be arranged in such manner as to ensure, in addition to their main function of heat exchange, another function, for example the deadening of noise, this being the case all the more as external installation enables internal noises to be obviated (both on the side where the flue gas is present and on the side where the air is present, in the case where the steam serves to heat the air of combustion).

In a new installation, it will generally be an advantage to utilize the heat of the intermediate fluid for heating combustion air, by condensing the steam generated by the heat regenerated from the flue gases with the combustion air of the boilers, this enabling optimum boiler efficiency of the latter to be obtained.

However, in some cases and in particular where existing boilers are concerned, difficulties may be encountered when the steam generated is condensed on the air of combustion. In fact, the effects on the operation of the boiler may be serious. They could demand remodelling of the latter.

According to a further feature of the invention, the heat of the steam is therefore used to heat the boiler feed water.

In one form of embodiment, the steam generated in an evaporator by water heated by the flue gases of a boiler is condensed in a low-pressure heater of the feed water circuit of the boiler. If this water is moreover heated, in accordance with a known method, by steam bled from a turbine, this form of embodiment provides an appreciable gain in the efficiency of the whole turbine boiler and feed system equipment. Even if the total benefit turns out at a value lower than that which might result from the transfer of heat from the steam generated by the flue gas heat to the combustion air, the heating of the feed water in the manner described is frequently preferable when it may be more easily carried into effect in existing installations.

The description which follows with reference to the accompanying drawings, given by way of non-limitative example, will make the various features of the invention and the manner of carrying them into effect easily understood, any arrangement appearing both from the text and from the figures coming, of course, within the scope of the said invention.

FIGURE 4 shows diagrammatically another form of embodiment in which one of the stages has a simple circulation of water or of any suitable fluid;

FIGURE 5 shows a form of embodiment in which the generated steam is utilized for heating feed water.

Figure 1:
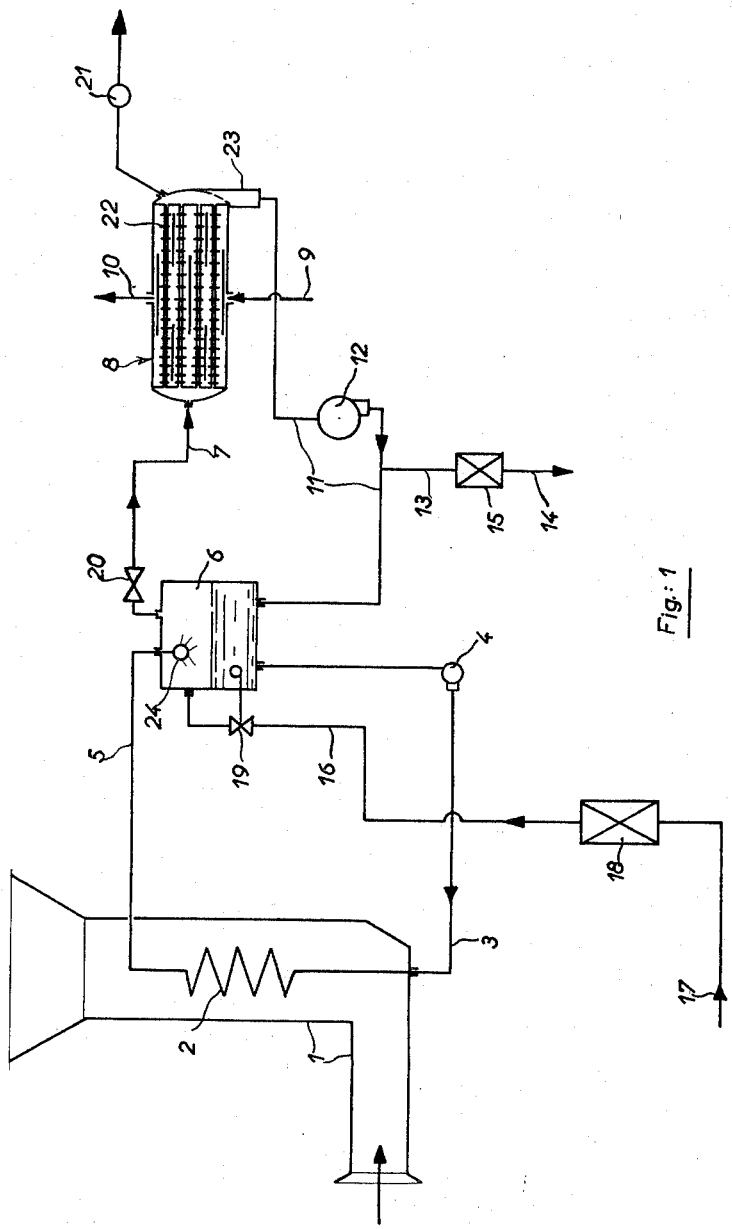
FIGURE 1 shows diagrammatically an apparatus according to the invention for heating combustion air.

Referring to FIGURE 1, in the outlet duct 1 for the flue gases of a boiler (not shown) there is arranged a heat exchanger 2 located in the path of the flue gases. The exchanger is fed, through a pipe 3, with water set in motion by a circulating pump 4, which could, however, be omitted when circulation would automatically be achieved by thermo-syphon circulation providing the flash evaporator 6 were located sufficiently above the heat exchanger 2. This water is heated by heat exchange with the flue gases and leaves the exchanger by a pipe 5.

In view of the relatively low temperature (of the order of 90° C.) at which it is desirable to deliver the cooled flue gases to atmosphere, the vaporization is effected at low temperature and the steam generated is then condensed under vacuum. To this end, the pipe 5 leads to the atomizer 24 of a flash evaporator 6 communicating by a steam pipe 7 with an air heater or condenser 8 provided, for the extraction of the uncondensable elements, with an ejector or vacuum pump 21, which may be that of the main turbine unit or form a separate device.

The condenser 8 comprises, for example, in known manner, finned tubes 22 through which flows the steam entering through the pipe 7 and condensing by being cooled by air entering at 9 and leaving at 10, said air then being conveyed to the furnace of the boiler by known means (not shown). The condensate collects in the terminal portion 23 of the condenser and is delivered by a pipe 11 and an extraction pump 12 to the bottom of the evaporator 6, where they rejoin the portion of the water which has arrived through the atomizer 24 and which has not vaporized. The water is picked up again by the mixing pump 4 from the bottom of the evaporator 6 to be delivered to the exchanger 2.

It will be seen that the heat of the flue gases is transmitted in the exchanger 2 to the water, which is heated therein and partially vaporized in the evaporator 6, while the unvaporized and cooled water collects at the bottom of the latter. The steam gives up its heat to the air of combustion in the condenser 8 and the condensate returns to the bottom of the vaporizer 6. This cooled water and the condensate is put into circulation again in the exchanger 2, forming a completely closed water circuit.

The heated air issuing at 10 may be given a complementary heating by the usual means or be delivered directly to the furnace of the boiler. Where there are steam air-heaters heated directly by expanded live steam, as in many present marine boilers, it is possible to use the existing air heaters to form the heater 8, making up their surfaces if need be. In this way, the output of the boiler to the utilizing devices is increased by the whole of the quantity of live steam originally used in the air heater.

It is to be observed that in this case, just as in new installations, in particular on board ships, comprising the apparatus according to the invention, the efficiency of the evaporating section is greater than the efficiency which this section would have had if it was provided with a usual device for heating the air by the steam owing to the fact that a certain quantity of live steam has not been used elsewhere than in the energy generating machinery.

As has been indicated hereinbefore, the water circuit of the apparatus described is completely closed and it is obvious that the water with which it is filled has preferably been suitably purified to avoid incrustation of the exchanger 2. The condensate leaving the air heater 8 is distilled water, part of which is used as make-up water in a high-pressure boiler. In the apparatus shown, this make-up water is withdrawn through a pipe 13 branching from the pipe 11 and is conveyed at 14 into the feed circuit of the boiler (not shown) after having undergone a complementary demineralization by exchange of ions in an apparatus 15 of known type, if this is deemed to be necessary.

To compensate for the make-up water withdrawn through the pipe 13, a feed pipe 16 is provided receiving at 17 unpurified water which is purified in an apparatus 18 of known type and leading to the evaporator 6 by way of a constant-level device 19. The make-up water for the main boiler feed system is withdrawn in small quantity at 13 and the replacement water is consequently introduced at 19 in small quantity and has only very little effect on the salts content of the water flowing through the exchanger 2. The major portion of the condensates, which has not been withdrawn at 13, returns by the pipe 11 to the evaporator 6 and the circuits functions practically speaking on distilled water.

To avoid the flue gases being cooled excessively at low working rates of the boiler, there is provided on the pipe 7 a remote-controlled valve 20 enabling the pressure of the steam to be controlled. By increasing this pressure, the temperature of the water is increased throughout the circuit and, consequently, the quantity of heat removed from the flue gas in the exchanger 2 is reduced.

The exchanger 2 can easily be arranged in such manner as to reduce the noise caused or transmitted in the flue gas duct 1. For example, this exchanger 2 may be arranged in the same way as the silencing grids which are usually provided in the flue gas ducts of electric power stations.

Figure 2:
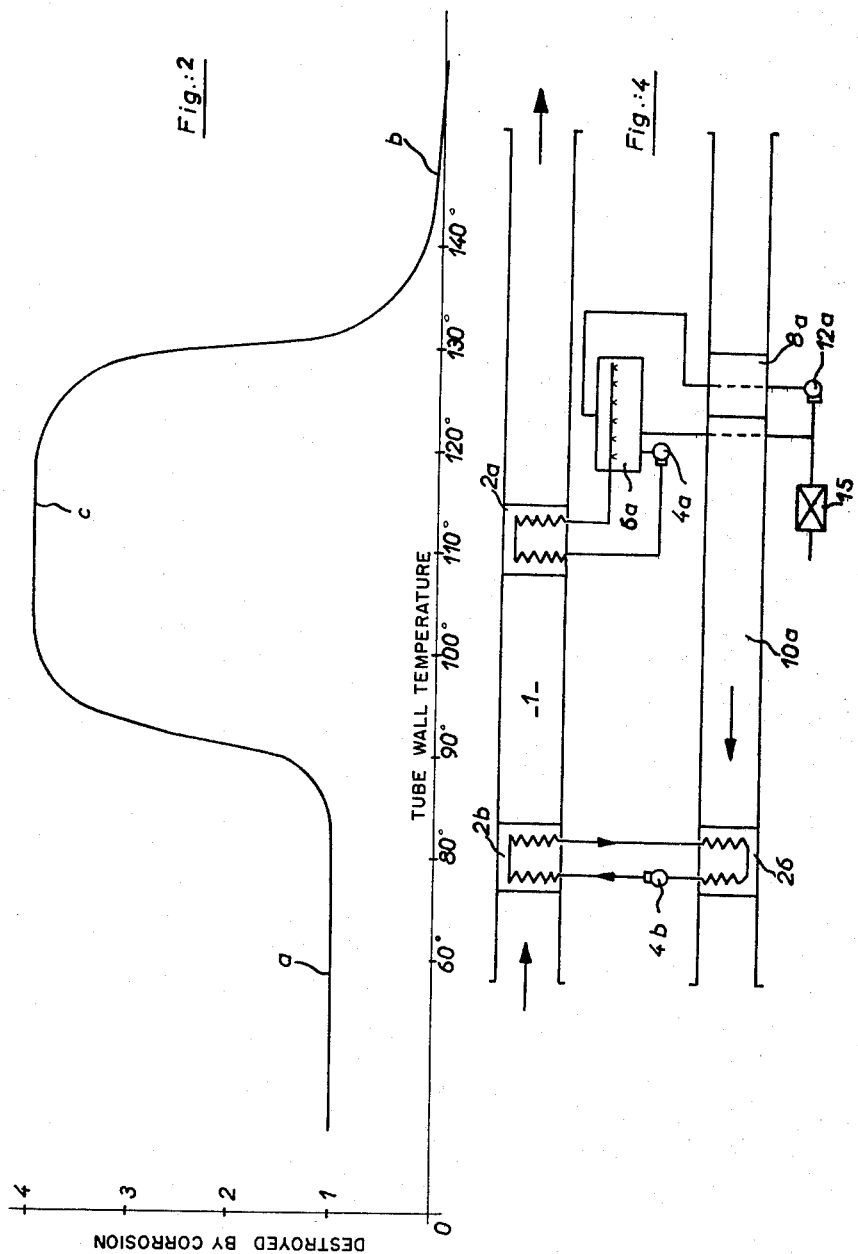
FIGURE 2 is a graph of the corrosion phenomena in a flue gas duct.

FIGURE 2 shows, in a special case given by way of example, the curve representative of the attack by corrosion of steel exchanger tubes in a flue gas duct. The wall temperature of the tubes on the side where the flue gases are present has been plotted as abscissae in degrees centigrade and the relative weight of steel destroyed by corrosion in a given time, in percentage of weight of the tubes, has been plotted as ordinates. It will be seen that on this curve there is a "bulge" $c$ which, in the example chosen, is situated between about 85° and 135°. When the outer walls of the tubes are between these temperatures, the corrosion is distinctly more marked than in the zones $a$ and $b$.

Figure 3:
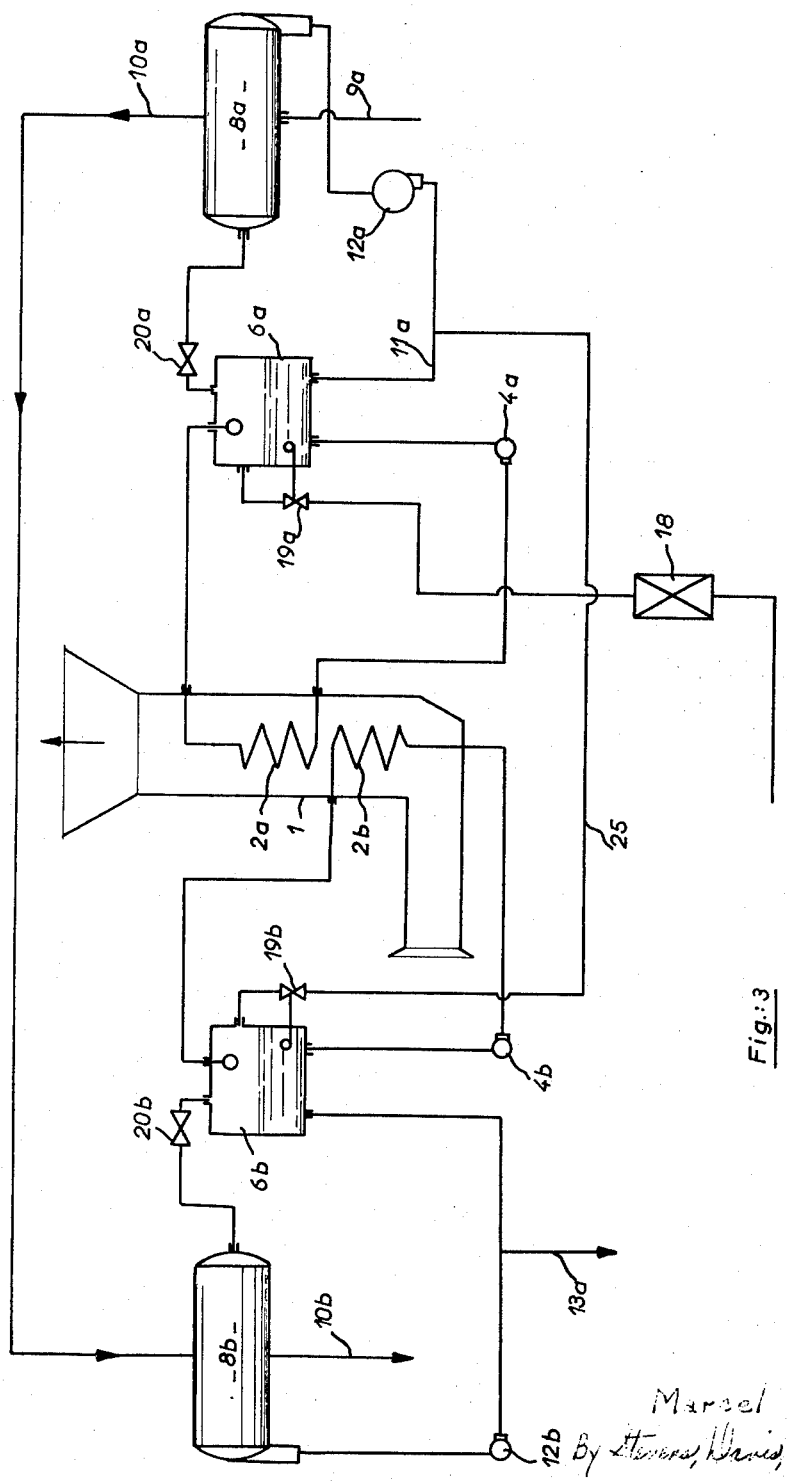
FIGURE 3 illustrates a regenerating apparatus according to the invention comprising two independent steam generating stages.

FIGURE 3 shows a form of embodiment of the invention comprising two independent steam generating stages the exchangers of which are respectively at temperatures contained in the zones $a$ and $b$. In the outlet duct 1 for the flue gases of the boiler there are disposed two tubular exchangers 2a and 2b located in series in the flue gas circuit, the exchanger 2a being downstream and the exchanger 2b upstream. Each of these exchangers is supplied with water delivered by pumps 4a, 4b and the water heated in each of them is conveyed to an evaporator 6a and 6b.

The steam generated in the evaporator 6a is conveyed into an air condenser 8a, where it is condensed by heating the air of combustion entering at 9a and leaving at 10a; the condensate is picked up by a pump 12a and delivered by the pipe 11a to the evaporator 6a, where it is picked up by the pump 4a, the circuit of the first stage being thus closed.

The second stage is independent of the first and likewise comprises the exchanger 2b, the evaporator 6b, the steam of which is condensed in the air condenser 8b, the pump 12b delivering the condensate in the latter to the evaporator 6b and the pump 4b picking up the water at the bottom of this evaporator to deliver it to the exchanger 2b. The air coming from the air condenser 8a is conducted by the pipe 10a into the air condenser 8b, where it is heated by the condensation of the steam; it issues at 10b to be conveyed to the furnace of the boiler.

The condensers 8a and 8b are similar to that shown in FIGURE 1.

A valve 20a, 20b located at the outlet of each of the two evaporators enables the steam pressure in each of the two stages and, consequently, the temperature of the water flowing through each of the exchangers 2a and 2b to be controlled. The latter are located in the flue gas circuit in such manner that it is possible to control these temperatures in this way so as to cause the temperatures of the walls on the side where the flue gases are present to be located as much as possible outside the dangerous zone. For example, in the case of FIGURE 2, the temperature of the water flowing through the exchanger 2a may be adjusted at 75° C. and in the exchanger 2b at 135° C.

The two steam generating stages moreover enable double distillation to be carried out. In FIGURE 3, a pipe 25 enables a portion of the condensates of the condenser 8a to be withdrawn to be conveyed into the evaporator 6b by a constant-level device 19b. In this way, the water which has been distilled once in the first stage (evaporator 6a and condenser 8a) is distilled a second time in the second stage and a portion of the water double distilled in this way may be withdrawn at 13a, on leaving the condenser 8b, to be used as make-up water for feeding the boiler. Its properties are sufficient to permit its direct use in the boiler, without it being necessary to subject it to a complementary demineralization. The water withdrawn in this way is made up in the first stage by means of unpurified water which is simply purified at 18, as in FIGURE 1, and introduced into the evaporator 6a by a constant-level device 19a.

FIGURE 4, in which those elements which perform the same function as in FIGURE 3 are designated by the same reference numerals, shows diagrammatically another form of embodiment in which the second regeneration stage has been replaced by a simple circuit for water or any other suitable fluid. The first stage is similar to that shown in FIGURE 3 and comprises the same elements, the exchanger 2a, the pumps 4a and 12a, the evaporator 6a and the air condenser 8a arranged in the combustion air circuit 10a being alone shown.

The second stage comprises a tubular exchanger 2b located in the duct 1 upstream of the exchanger 2b and supplied with fluid delivered by a pump 4b, and an exchanger 26 located in the combustion air duct 10a downstream of the condenser 8a. The fluid heated in the exchanger 2b flows through the exchanger 26, where it gives up its heat to the air of combustion already heated in the condenser 8a, then returns to the exchanger 2b.

As in FIGURE 3, the temperature of the water flowing through the exchanger 2a will be adjusted for example at 75° C. and the temperature of the fluid flowing through the exchanger 2b will be adjusted at 135° C.

An arrangement such as this requires equipment simpler than that shown in FIGURE 3 and can be used with advantage if double distilled water is not needed. The make-up feed water is withdrawn on leaving the pump 12a and, if required, is subjected to a complementary demineralization at 15 before being used. The water withdrawn is made up in the evaporator 6a as in the case of FIGURE 3.

The arrangement shown in FIGURE 4 offers the same advantages as that shown in FIGURE 3 from the point of view of corrosion.

In the apparatus illustrated in FIGURE 5, the heat of the flue gases is regenerated in a single stage and used to heat the feed water. The elements performing the same function as in the previous figures are designated by the same reference numerals, to which the index $c$ has been attached. The water heated by the flue gases in the exchanger 2c is partially vaporized by flashing in the evaporator 6c. The steam generated is delivered to a condenser 27, where it is condensed in heating the feed water entering at 28 and issuing at 29 to feed the boiler.

The arrangement is similar to that shown in FIGURE 1, but the air condenser is replaced by the condenser 27. Here again, a part of the condensates is withdrawn on leaving the pump 12c and used as make-up feed water after having, if necessary, been subjected to a complementary demineralization at 15. The withdrawals are made up in the evaporator 6c by water purified at 18 and introduced by a constant-level device 19.

It is obvious that the forms of embodiment which have been described are only examples and that they could be modified, in particular by substituting equivalent technical means, without thereby departing from the scope of the invention. In particular, the arrangement for heating the feed water by regeneration of the heat of the flue gases which has been described with reference to FIGURE 5 could be produced in two independent stages, is in the case of FIGURE 3 or 4.

What is claimed is:

1. In a boiler installation having an outlet duct for flue gases, with a zone of relatively low teemperatures therein, a system for regenerating heat in flue gases in said outlet duct, comprising heat-exchange means for placing an auxiliary fluid, constituted by water, in heat-exchange relationship with said gases in said low-temperature zone of said outlet duct in order to heat said auxiliary fluid; means for partially vaporizing said heated auxiliary fluid outside said outlet duct, means for conveying said auxiliary fluid from said heat exchange means to said vaporizing means; means for condensing the vaporized portion of said auxiliary fluid so as to heat a second fluid, and means for conveying said vaporized portion of the auxiliary fluid from said vaporizing means to said condensing means; means for injecting said heated second fluid into said boiler installation to improve the efficiency thereof; means for withdrawing a portion of said condensed auxiliary fluid; means for feeding said withdrawn portion as make-up feed water for the installation; means for supplying water to compensate for said withdrawn portion of the condensed auxiliary fluid; and means for recycling in said heat exchange means the remainder of the condensed auxiliary fluid together with said compensating water.

2. A system according to claim 1 wherein the vaporizing means comprises an evaporator including a flash chamber and means to introduce the auxiliary fluid into said flash chamber to effect vaporization by flashing the heated auxiliary fluid into said flash chamber.

3. A system according to claim 1, including means for varying the pressure of the vaporized auxiliary fluid, so as to control the temperature of said fluid which is in heat-exchange relationship with said gases in said outlet duct.

4. A system according to claim 1, wherein said heat-exchange means comprise at least two heat-exchangers located in series in said outlet duct and each having a heat exchange surface, means being provided to control the temperature of auxiliary fluid in said heat-exchangers whereby, the temperatures of the respective heat-exchange surfaces, at the side thereof impinged by flue gases, can be adjusted so as to lie on one side and the other of a temperature zone which is dangerous from the point of view of corrosion.

5. A system according to claim 1, wherein the heat exchange means, vaporizing means and condensing means comprise high pressure and low pressure assemblies, the withdrawal means withdraws said portion of the condensed auxiliary fluid from the condensing means of the high pressure assembly, means conveying a portion of the condensed auxiliary fluid from the low pressure assembly to the vaporizing means of the high pressure assembly, and the compensation means is arranged to supply said compensating water to the vaporizing means of the low pressure assembly.

6. A system as claimed in claim 1, including cooling means for keeping a temperature of the flue gases in the outlet duct out of the temperature zone which is dangerous from the point of view of corrosion, said cooling means being located upstream of the heat exchange means in said flue gas circuit.

7. A system as claimed in claim 6, wherein said cooling means comprise additional means for regenerating heat from the flue gases.

8. In a boiler installation having an outlet duct for flue gases, with a zone of relatively low temperature therein, a system for regenerating heat in flue gases in said outlet duct, comprising heat-exchange means for placing an auxiliary fluid, constituted by water, in heat-exchange relationship with said gases in said low-temperature zone of said outlet duct in order to heat said auxiliary fluid; means for partially vaporizing said heated auxiliary fluid outside said outlet duct, means for conveying said auxiliary fluid from said heat exchange means to said vaporizing means; means for condensing the vaporized auxiliary fluid so as to heat combustion air for said boiler installation to improve the efficiency thereof, means for conveying vaporizing auxiliary fluid from said vaporizing means to said condensing means, means for withdrawing a portion of said condensed auxiliary fluid, means for feeding said withdrawn portion as make-up feed water for the installation; means for supplying water to compensate for said withdrawn portion of the condensed auxiliary fluid; and means for recycling in said heat-exchange means the remainder of the condensed auxiliary fluid together with said compensating water.

References Cited by the Examiner

UNITED STATES PATENTS

| 1,151,831 | 8/15 | Semmler | 122—35 |
| 2,433,547 | 12/47 | Dalin et al. | 122—7 |
| 2,635,587 | 4/53 | Dalin et al. | 122—1 |

FOREIGN PATENTS

| 202,961 | 1/24 | Great Britain. |
| 536,603 | 5/41 | Great Britain. |

FREDERICK L. MATTESON, JR., *Primary Examiner.*

KENNETH W. SPRAGUE, *Examiner.*